(12) United States Patent
Farmer

(10) Patent No.: US 9,692,078 B2
(45) Date of Patent: *Jun. 27, 2017

(54) HIGH-PERFORMANCE RECHARGEABLE BATTERIES WITH FAST SOLID-STATE ION CONDUCTORS

(71) Applicant: LAWRENCE LIVERMORE NATIONAL SECURITY, LLC, Livermore, CA (US)

(72) Inventor: Joseph C. Farmer, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,518

(22) Filed: Nov. 22, 2016

(65) Prior Publication Data

US 2017/0149094 A1    May 25, 2017

Related U.S. Application Data

(62) Division of application No. 12/890,099, filed on Sep. 24, 2010.

(60) Provisional application No. 61/246,018, filed on Sep. 25, 2009.

(51) Int. Cl.
*H01M 8/22* (2006.01)
*H01M 12/08* (2006.01)

(52) U.S. Cl.
CPC ............. *H01M 8/22* (2013.01); *H01M 8/227* (2013.01); *H01M 12/08* (2013.01)

(58) Field of Classification Search
CPC ........ H01M 8/18; H01M 8/188; H01M 8/184; H01M 8/186; H01M 8/20; H01M 10/052; H01M 10/0562; H01M 10/39; H01M 10/3909; H01M 10/7011; H01M 12/08; H01M 2300/0065; H01M 2300/0077; B82Y 30/00; Y02E 60/122

See application file for complete search history.

(56) References Cited

U.S. PATENT DOCUMENTS

| | | | |
|---|---|---|---|
| 3,443,997 | A | 5/1969 | Argue et al. |
| 5,372,691 | A | 12/1994 | Kao et al. |
| 6,936,185 | B1 | 8/2005 | Schulz et al. |
| 2003/0069129 | A1 | 4/2003 | Lefebvre |
| 2006/0127731 | A1 | 6/2006 | Faris |
| 2006/0208692 | A1 | 9/2006 | Kejha |
| 2007/0048619 | A1 | 3/2007 | Inda |
| 2008/0261116 | A1 | 10/2008 | Burton et al. |
| 2008/0311480 | A1 | 12/2008 | Sano |
| 2009/0092903 | A1 | 4/2009 | Johnson et al. |
| 2009/0297895 | A1 | 12/2009 | McLean et al. |
| 2009/0325070 | A1 | 12/2009 | Soloveichik et al. |
| 2010/0151336 | A1 | 6/2010 | Nakanishi |
| 2012/0115046 | A2 | 5/2012 | Mak et al. |

FOREIGN PATENT DOCUMENTS

| | | |
|---|---|---|
| WO | 2008136296 | 11/2008 |
| WO | 2009151639 | 12/2009 |
| WO | 2011038233 | 3/2011 |

*Primary Examiner* — Stephen Yanchuk
(74) *Attorney, Agent, or Firm* — Eddie E. Scott

(57) ABSTRACT

A high-performance rechargeable battery using ultra-fast ion conductors. In one embodiment the rechargeable battery apparatus includes an enclosure, a first electrode operatively connected to the enclosure, a second electrode operatively connected to the enclosure, a nanomaterial in the enclosure, and a heat transfer unit.

2 Claims, 3 Drawing Sheets

HIGH-PERFORMANCE RECHARGEABLE BATTERIES WITH FAST SOLID-STATE ION CONDUCTORS

CROSS-REFERENCE TO RELATED APPLICATIONS

This application is a Division of Co-pending U.S. Non-Provisional patent application Ser. No. 12/890,099 filed Sep. 24, 2010, entitled, "High-Performance Rechargeable Batteries with Nanoparticle Active Materials, Photochemically Regenerable Active Materials, and Fast Solid-State Ion Conductors," which claims priority based upon U.S. Provisional Patent Application No. 61/246,018 filed Sep. 25, 2009, entitled "Novel High-Performance Rechargeable Batteries with Fast Solid-State Ion Conductors," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to batteries, and more particularly to, high-performance rechargeable batteries with fast solid-state ion conductors.

State of Technology

Electrochemical energy storage is required for grid storage, wireless communications, portable computing, and will be essential for the realization of future fleets of electric and hybrid electric vehicles, which are now believed to be an essential part of the world's strategy for reducing our dependence on oil, and minimizing the impact of gaseous emissions of $CO_2$ on global warming. In looking at those possible materials that can be used for anodes in electrochemical energy conversion and storage systems, hydrogen and lithium have the highest specific capacities (Ah/kg). Hydrogen is of course used to power fuel cells, while lithium is used in advanced rechargeable batteries.

Most state of the art energy storage systems use lithium ion battery chemistry, with graphite anodes that intercalate lithium upon charging, mixed transition metal oxide cathodes that intercalate lithium during discharge, a microporous polyethylene electrode separator, and electrolyte formed from a dielectric mixed solvent composed of organic carbonates and high-mobility lithium salts. The movement of the lithium ions between the intercalation anodes and cathodes during charge and discharge is known as the "rocking chair" mechanism.

Cells with liquid electrolytes are usually contained in cylindrical or prismatic metal cans, with stack pressure maintained by the walls of the can, while cells with polymer gel electrolytes are usually contained in soft-side aluminum-laminate packages, with stack pressure achieved through thermal lamination of the electrodes and separators, thereby forming a monolithic structure.

The active graphite or transition metal oxide materials used in the electrodes exist as fine powders, coated onto thin metal foils of copper and aluminum, respectively, and held in place by a PVDF binder. Both natural and manmade graphite such as MCMB have been used for the anodes, while $Li_xCoO_2$, $LiNiO_2$, $Li_xMn_2O_4$, mixed transition metal oxides with cobalt, nickel and manganese, and iron-phosphates are common choices for the cathode.

Over the past decade, these systems have attained outstanding specific energy and energy density, exceptional cycle life and rate capabilities that enable them to now be considered for both vehicular and power tool applications, in addition to their early applications in wireless communications and portable computing. The best commercially available, polymer-gel lithium ion battery now has a specific energy of 180 to 200 Wh/kg, an energy density of 360 to 400 Wh/L, and a reasonably good rate capability, allowing discharge at C/2 or better.

Both liquid prismatic and polymer gel cells have been incorporated into large high-capacity power packs and used to power the mobile electric vehicles. Such high capacity systems have state-of-the-art computerized charge and discharge control, which includes graphical user interfaces, sensing for monitoring the health of individual cells, and charge balancing networks.

Such lithium ion batteries, which rely on the rocking chair mechanism, are generally believed to be safer than those where lithium exists in the reduced metallic state. However, the use of flammable liquid-phase and two-phase polymer gel electrolytes, coupled with a high energy density, a relatively delicate 20-micron thick polymeric separator, and the possibility of lithium plating and dendrite formation due to non-uniform stack pressure and electrode misalignment has led to safety problems with these energy storage systems. The possibility of such an event occurring on commercial airliners, where many passengers carry laptop computers and cell phones with such batteries, is especially disconcerting. These events have occurred on much larger scale, and have caused industry-wide concern in the continued use of this important technology.

Adequate and intelligent thermal management in these cells is essential. High rates of charge or discharge drives the temperature upward due to resistive heating of the electrolyte. When the core temperature of these cells exceeds approximately 150° F., the systems frequently become unstable, with the possible initiation of autocatalytic reactions, which can lead to thermal runaway and catastrophic results. Disproportionation of the transition metal oxides can liberate sufficient oxygen to support oxidation of the organic carbonate solvents used in the liquid or polymer-gel electrolytes. It is now recognized that while conventional systems provide high energy density, their safety remains problematic.

The treatise, *Introduction to Nanotechnology*, by Charles P. Poole, Jr., and Frank J. Owens. John Wiley &. Sons, 2003, states: "Nanotechnology is based on the recognition that particles less than the size of 100 nanometers (a nanometer is a billionth of a meter) impart to nanostructures built from them new properties and behavior. This happens because particles which are smaller than the characteristic lengths associated with particular phenomena often display new chemistry and physics, leading to new behavior which depends on the size. So, for example, the electronic structure, conductivity, reactivity, melting temperature, and mechanical properties have all been observed to change when particles become smaller than a critical size."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a high-performance rechargeable battery using ultra-fast ion conductors. In one embodiment, the present invention provides high-performance rechargeable batteries based upon ultra-fast solid-state ion conductors. The present invention will help the creation of a completely solid-state alternative to liquid-filled and polymer-gel lithium ion batteries. The scientific and technological advancement of the present invention will assist in enabling dramatic performance enhancements through the reduction of inert materials in the battery; huge improvements in safety through the elimination of flammable organic liquids; U.S. dominance in advanced battery technology through the introduction of a disruptive technology; and help secure the future of the U.S. automotive industry, which includes electric vehicles.

The present invention will also help result in the creation of a room-temperature sodium-beta (or equivalent) battery for electrical grid management and transportation. Additional scientific and technical advancement of the present invention will enable load leveling for better utilization of power from fossil and nuclear plants; introduction of power from green sources such as wind and solar that are characterized by fluctuations from day-tonight, and from season-to-season; and utilization of the benefits of sodium-beta batteries for such applications, without the heat losses associated with high-temperature operation, and without the need for thermal insulation which increases the volume required by such energy storage devices.

The present invention will also help provide a completely solid-state alternative to lithium ion batteries and a room-temperature alternative to conventional sodium-beta batteries, rely on solid-state fast ion-conductors. The present invention will therefore drive the development of new solid-state ion conductors. Some specific quantifiable goals of one embodiment of the present invention that will guarantee adoption of these next-generation technologies are to: develop one or more inherently safe, high-performance rechargeable batteries based upon ultra-fast solid ion conductors; develop viable energy storage devices with solid-state electrolytes with specific energies ranging from 500 to 2500 Wh/kg, thereby achieving as much as an order of magnitude enhancement in energy storage capability; eliminate the need for volatile flammable organic solvents for electrolytes, to the extent possible; and develop room-temperature variants of the high-temperature sodium-beta batteries now used for electrical grid management, and transportation.

The present invention has use in intelligent grid management for energy security, safe electric vehicles with dramatic range extension and energy storage. The present invention also has use in energy storage for battle field applications, including military bases, silent watch, propulsion for ships, directed energy weapons and other applications. The present invention has exceptional specific energy (ultimately, several times greater than that of conventional Li-ion batteries), is intrinsically safe, exhibits long cycle life due to exceptional reversibility and dimensional stability, and can operate at room temperature.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
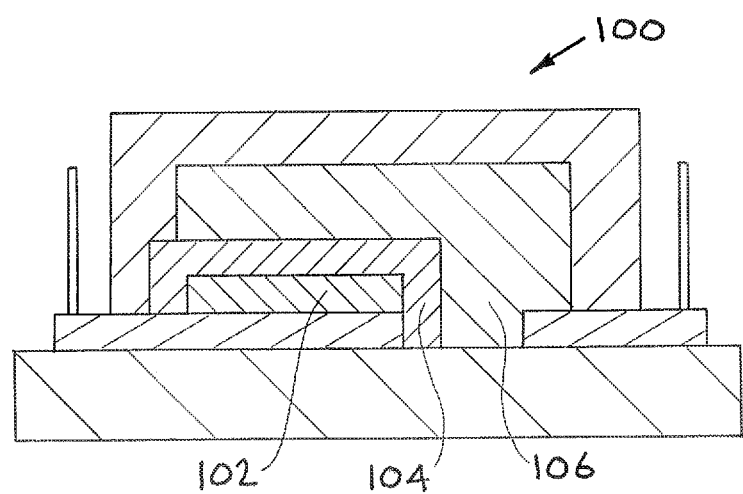
FIG. 1 illustrates one embodiment a rechargeable battery of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a rechargeable battery. The rechargeable battery includes an enclosure, a first electrode operatively connected to the enclosure, a second electrode operatively connected to the enclosure, a nanomaterial in the enclosure, and a heat transfer unit.

The nanomaterial is defined as: nanomaterial+dielectric. A wide range of nanoparticles can be used. For example the following nanoparticles can be used: metal and metal alloy particles for anodic dissolution and thermal transport; hydrides as source of hydrogen ions; lithium and lithium alloys; intercalated graphite and carbon aerogel as Li source (anodic material); intercalated transition metal oxide as Li sink (cathodic material); and semiconductors for photovoltaic conversion in photo-electrochemical or hybrid electrochemical cell.

The particle suspension is defined as: particle suspension=particles+dielectric or ionic fluid. A wide range of particles can be used. For example the following particles can be used: metal and metal alloy particles for anodic dissolution and thermal transport; hydrides as source of hydrogen ions; lithium and lithium alloys; graphite intercalated with lithium; and carbon aerogel with a coating of lithium as a lithium source (anodic material); intercalated transition metal oxides as lithium sink (cathodic material); and semiconductors for photovoltaic conversion in photo-electrochemical or hybrid electrochemical cell.

Nanoparticles or particles for the nanomaterial anolyte can be made of pure elemental materials including Pb, Cd, Zn, Fe, Na, Ca, Mg, Al, and Li, as well as any alloy formed from these pure elemental materials. In the case of a nanofluid flow cell using lithium-ion type chemistry, the nanoparticles in the anolyte could be Li-intercalated natural graphite, Li-intercalated synthetic graphite, Li—S; alloys, Li—Sn alloys, or other Li-containing alloys or compounds. Similar compositions can be used for particles suspensions. In the case of a nanofluid flow cell using lithium-ion type chemistry, the nanoparticles in the catholyte could be a transition metal oxide such as $Li_xCoO_2$, $Li_xNiO_2$, $Li_xMn_2O_4$, a mixed transition metal oxide such as $Li_x(Co, Ni, Mn)O_2$, or a phosphate such as $Li_xFePO_4$. Similar compositions can be used for particle suspensions. Hydrides can also be used for anolyte nanoparticles or particles.

Referring now to the drawings and in particular to FIG. 1, a solid-state cell for on-chip applications is illustrated. The cell is designated generally by the reference numeral 100. Metal-air batteries provide advantages over systems where both reactants are carried with the device as payload. Since the systems are air breathing, taking one of the reactants from the atmosphere, they are able to provide large advantages in regard to energy density and specific energy. The present invention should be able to achieve 2500 Wh/kg, with a limit of approximately 5000 Wh/kg. Typically the electrochemical dissolution of a metal anode is depolarized by oxygen reduction at an air-breathing cathode. Unfortunately, these systems lack the reversibility required to serve as rechargeable batteries, and are usually used as primaries. Alternatively, mechanically refueling can be used, where anode material is continuously fed to the system.

Metal air batteries of the present invention can be built that are entirely analogous to solid oxide fuel cells. In these systems, YSZ ($Y_2O_3$-stabilized $ZrO_2$) electrolytes are be used, with the formation of oxygen anions at the outer surface of the YSZ at a porous catalytic metal electrode, such as platinum, and then transported through the YSZ to the anode compartment, where they react with metal cations to form oxides. One possibility is a high-temperature lithium-air battery. Rechargeability requires reversibility of the oxide-formation at the YSZ/anode interface. By using low-melting eutectics, the anode can be kept in liquid phase at ambient temperature, and oxides can be bathed in the molten metal, with the possibility of dimensional stability of the electrode, and reversibility of the oxidation reaction between the oxygen anions and the metal cations.

Sodium-Beta Batteries

Sodium-beta batteries are crucial energy storage devices that rely heavily on solid-state fast ion conductors. In general, these batteries have a molten sodium anode and a 3"-alumina, sodium-ion conductive, high-temperature solid-state electrolyte and separator. Two variants exist, known as sodium/sulfur and sodium/metal-chloride cells. The sodium/metal-chloride battery is also known as the ZEBRA battery.

Background on Na—S Battery

The most well developed sodium-beta battery is the Na—S system, which uses a sodium ion-conductive electrolyte, operating at a high temperature to maintain the sodium anode and the sulfur cathode in a molten state. During discharge, the molten Na is oxidized at the Na/β"-$Al_2O_3$, forming Na+ ions. These ions migrate through the β-$Al_2O_3$ electrolyte, which is usually in the form of a ceramic tube. The beta-alumina solid electrolyte is sometimes referred to as BASE.

After diffusion through the (3"-$Al_2O_3$ separator, Na" ions combine with sulfur reduced at the positive electrode, thereby forming sodium pentasulfide ($Na_2S_5$), which is immiscible with the remaining molten sulfur. A two-phase system is therefore formed during the initial stage of discharge. After all of the free sulfur is converted to $Na_2S_5$ during the initial stage of discharge, the cell enters a second stage of discharge, with the formation of single-phase polysulfides with higher sulfur content ($Na_2S_x$, where x=2.7 to 5). If discharge continues, the cell enters the third stage with the formation of a second two-phase system consisting of residual $Na_2S$,' and $Na_2S_2$. Most cells are designed to prevent the formation of $Na_2S_2$ during such over discharge.

Stationary Power Applications

The sodiumlsulfur (Na—S) battery has enjoyed widespread use for stationary applications, such as grid management. As pointed out by the California Energy Commission during their Energy Storage Workshop, in the presentation entitled Overview of Na—S Battery for Load Management, this generic type of battery is potentially very useful for electrical grid applications. Multi-megawatt class systems have been built and deployed. With the increasing uses of green sources of energy, such as solar, wind and tidal, with variable production rates, the need for reliable energy storage on the grid is becoming even greater.

The Na—S battery is very similar to the ZEBRA battery, and has enjoyed widespread use for stationary applications, such as grid management. As pointed out by the California Energy Commission during their Energy Storage Workshop, in the presentation entitled Overview of Na—S Battery for Load Management, this generic type of battery is potentially very useful for electrical grid applications. With the increasing uses of green sources of energy, such as solar, wind and tidal, with variable production rates, the need for reliable energy storage on the grid is becoming even greater.

Background on ZEBRA

The ZEBRA cell is considered to be a variant of the sodium-beta type since it also has a molten sodium anode and a 13"-alumina, sodium-ion conductive, high-temperature solid-state electrolyte and separator, and is also referred to as a Na—$NiCl_2$ cell. Applications for the ZEBRA battery include a variety of electric vehicles, such as delivery vans, taxis, school buses, passenger cars, surface ships and submarines, and stationary applications similar to those for the Na—S cell The ZEBRA battery was invented in 1985 by a group led by Dr. Johan Coetzer at the CSIR in Pretoria, South Africa, and is generally considered safer and more robust due to the replacement of the molten sulfur electrode with a metal/metalchloride electrode. Some authors state that the ZEBRA name stands for the "Zeolite Battery Research Africa Project" which developed the technology, which seems most reasonable, while other authors state that ZEBRA name stands for "Zero Emission Battery Research Activities."

The ZEBRA cell is considered to be a variant of the sodium-beta type since it has a molten sodium anode and a (13"-alumina, sodium-ion conductive, high-temperature solid-state electrolyte and separator, and is also referred to as a Na—$NiCl_2$ cell. The ZEBRA cell has an open circuit voltage of 2.58 volts, and consists of a molten sodium anode, an electrolyte of $NaAlCl_4$, which melts at 160° C. (320° F.) and freezes at 157° C. (315° F.), a sodium-ion conducting 3"-$Al_2O_3$ separator, and a $NiCl_2$/Ni cathode. The shorthand notation for the ZEBRA cell is: Na/β"-$Al_2O_3$/$NaAlCl_4$/$NiCl_2$/Ni. The range of operating temperature for this battery is given as 270° C. (517° F.) to 350° C. (662° F.). This battery technology had achieved a specific energy of 85 Whlkg and a specific power 150 W/kg.

Goals for Development of Disruptive Energy Storage Technology

Specific goals are: (1) to develop one or more inherently safe, high performance rechargeable batteries based upon ultra-fast solid ion conductors; (2) identify viable pathways to specific energies ranging from 1000 to 5000 Wh/kg thereby achieving as much as an order of magnitude enhancement in energy storage capability; and (3) where possible, eliminate the need for volatile flammable organic solvents for electrolytes. Such technology would provide an attractive and enabling alternative for advanced electric vehicles for domestic and military applications, as well as for mobile directed energy weapons.

Development of Solid-State Fast Ion Conductors for Advanced Battery Systems

The lithium-ion battery is mature, with a specific energy that is not expected to increase substantially above 200 Wh/kg, and is plagued with safety issues associated with the flammable organic solvents used in the liquid and polymer gel electrolytes, and gaseous products from fires such as HF. The ZEBRA battery is an inherently safe alternative, but requires a high operating temperature, between 270° C. and 350° C. Thermal insulation necessary for high temperature operation can limit energy losses from the battery to between 10% and 25% of the stored energy, but lower the energy density substantially.

Work is proposed here to systematically explore new cell chemistries that promise to provide substantially greater specific energy and energy density than either modern lithium-ion systems, or the sodium-beta (ZEBRA) battery, using the fastest solid-state ion-conductors known to replace liquid-phase electrolytes. Such solid state electrolytes include materials such as Lii (cep), a-AgI (bee), $RbAg_4I_5$ (distorted cubic), (3"-$Al_2O_3$ (spine] blocks) and $Y_2O_3$-stabilized $ZrO_2$. Note that the ionic crystal with the highest known ion conductivity is $RbAg_4Is$. These are summarized below:

Silver Iodide (Mobile Ag')
T<146° C. y-AgI (Zinc Blende) & (3-AgI (Wurtzite)
T>146° C.-* a-AgI (Body Centered Cubic)-* a-100 S m'
Rubidiuim-Substituted Silver Iodide (Mobile Ag')
T 25° C.-$RbAg_4I_{.5}$ (Fixed I & Rb; Mobile Ag)-cr-25 S m-'
Activation Energy for 1-lopping r., 0.07 eV
Solid-State Battery: Ag & $RbI_3$ Electrodes
Beta Alumina (Mobile Na')
T 300° C.-* R"-$(Al_2O_3)_{11}(Na_2O)$, (Spine] Blocks)→a 10 S m-'
Sodium-Sulfur Cell: Na Anode & Sulfur Cathode
Stabilized Cubic Zirconia (Mobile $O^{2-}$)
T 900° C.-$(ZrO_2)_9(Y_2O_3)_1$ (Cubic)--6--1 S m-'
T . . . , 500° C.---a $(ZrO_2)_{85.72}(CaO)_{15}$-28 (Cubic)--a 6-500 S n11
Oxygen Sensor & Solid Oxide Fuel Cell: O2 Cathode & H2 Anode To achieve rate capabilities comparable Li-ion batteries, solid-state electrolytes that have ion conductivities comparable to the liquid-phase electrolytes are used. The Li-based sold-state electrolyte with the best performance appears to be $Li_{0.36}1_{0\ 14}O_{0.007}P_{0.11}S_{0.38}$ with a conductivity of 0.5 mS/cm at ambient temperature, though non Li-based compounds are seen that exceed this bench-mark by great margin.

EXAMPLE(S)

One embodiment of the present invention includes construction of practical three-dimensional cell architectures with solid-state fast ion conducting electrolytes and completely reversible, dimensionally-stable liquid electrodes, with the demonstration of a I Ah cell including the following steps:

Coating nanostructural material such as carbon with materials necessary for metal-halogen electrode ($Fe/FeCl_2$, $Ni/NiCl_2$, Ag/AgCl, Ag1AgI, Rb/RbI, $Rb/RbI_{3s}$ etc.) using appropriate techniques, which may include CVD, PVD, including but not limited to ALD.

Overcoating of the resultant structure with appropriate film and/or coating of solid-state fast ion conductor. If insurmountable dimensional stability problems are encountered with homogenous inorganic ion-conducting films, a coating with dispersed particles with a polymeric binder can be used.

Infiltration of the pore structure with liquid-phase low-melting eutectic metal anode, thereby forming the second electrode in a unique three-dimensional battery system with unparalleled rate capability, and none of the problems of self shielding usually encountered with porous electrode systems.

Performance testing of three-dimensional system with novel low-melting eutectic metal electrode infiltrated into pores of nanostructural battery.

Applications in Terrestrial Vehicles

Applications for these rechargeable batteries have focused primarily on their potential used in electric vehicles, including delivery vans, taxis, ships and submarines. Individual cells with the nominal cell voltage of 2.58 volts and capacity of 32 Ah have been configured in series-parallel arrays, thereby achieving an OCV of 300 volts. Module voltages from 24 to 1000 volts, and module stored energy of 2 to 50 kWh are discussed in the literature.

Surface Ship and Submarine Applications

Despite the history of the lead acid battery (LAB) in marine and submarine applications, it is considered to be somewhat unreliable. Problems are still encountered with short circuits that can lead to self-discharge, sudden-death and cell replacement. The failure of a single cell can significantly degrade the overall performance of a larger battery.

In marine and submarine applications, the ZEBRA battery appears to alloy the battery, once charged, to retain 100% of its charge, regardless of whether the battery is maintained at its operating temperature, or allowed to cool down (to a frozen state). From a mission readiness point-of-view, it is conceivable that the batteries on a submarine could be charge to 100% SOC, and then placed in a frozen state for a period of years. With a 24-hour heating period, the cells would be ready to go.

Example—Air or Oxygen Breathing Battery

Figure 2:
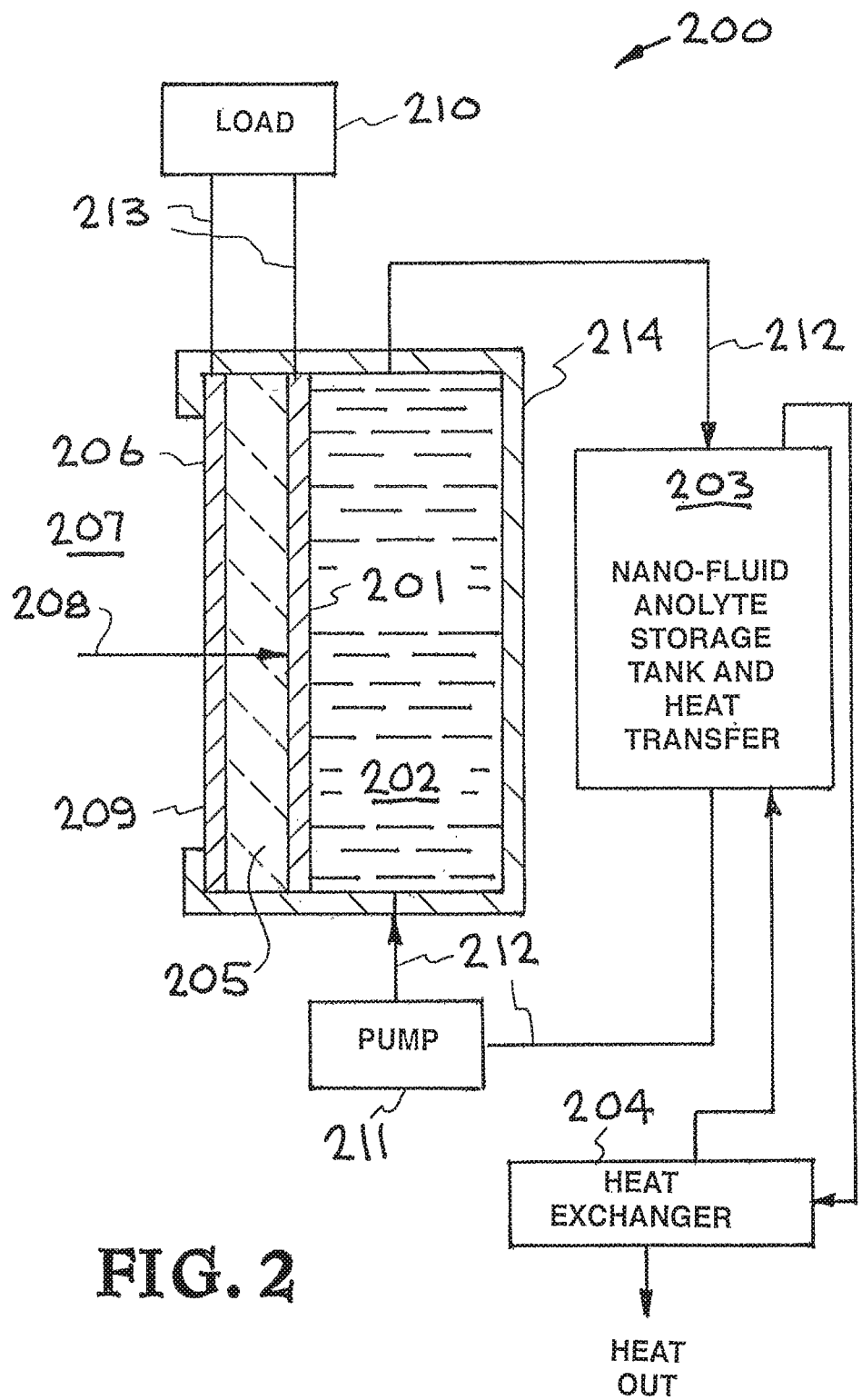
FIG. 2 illustrates another embodiment a rechargeable battery of the present invention.

An example of an electro-chemical energy conversion and storage system constructed in accordance with the present invention is illustrated in FIG. 2. The air or oxygen breathing nanofluid or particle suspension flow battery is designated generally by the reference numeral 200. The air or oxygen breathing nanofluid or particle suspension flow battery 200 includes the following components: electro-catalytic anode 201, nanofluid or particle suspension anolyte 202, nanofluid or particle suspension anolyte storage tank & heat transfer 203, heat rejection 204, electrolyte & separator 205, oxygen cathode 206, oxygen or air 207, selective transport of molecular oxygen 208, oxygen selective membrane 209, load 210, pump 211, fluid lines 212, electrical connectors 213, and housing 214. The housing is made at least in part of a non-conductive material. The air or oxygen breathing nanofluid or particle suspension flow battery 200 provides a new inherently safe, high-energy, high-rate rechargeable battery.

The air or oxygen breathing nanofluid or particle suspension flow battery 200 includes electro-oxygen cathode 206, and electro-catalytic anode 201. The electro-oxygen cathode 206 and electro-catalytic anode 201 are electrically connected across load 206 by electrical connectors 213.

Oxygen or air 207 provides selective transport of molecular oxygen 208 through oxygen selective membrane 209 to electrolyte and separator 205.

The nanofluid or particle suspension anolyte 202 is contained within housing 214 adjacent oxygen cathode 206 and electro-catalytic anode 201.

The electro-catalytic anode 201 gives up electrons at a potential above that of the electro-oxygen cathode 206. The conductive link via the load 210 through electrical connectors 213 carries electrons from the electro-catalytic anode 201 to the electro-oxygen cathode 206. The nanofluid or particle suspension anolyte 202 dissociates ions. These ions serve to deliver electrons and chemical matter through the nanofluid or particle suspension anolyte 202 to balance the flow of electric current through the load 210 during operation.

The nanofluid or particle suspension anolyte 202 is circulated to a nanofluid or particle suspension anolyte storage tank and heat transfer unit 203 through fluid lines 212 by pump 211. Nanofluid or particle suspension anolyte storage tank and heat transfer unit 203 provides heat rejection 204. The nanofluid or particle suspension anolyte 202 is a nanofluid or particle suspension.

The nanofluid is defined as: nanofluid=nanoparticles+dielectric or ionic fluid. A wide range of nanoparticles can be used. The particle suspension is defined as: particle suspension=particles+dielectric or ionic fluid. A wide range of particles can be used.

Figure 3:
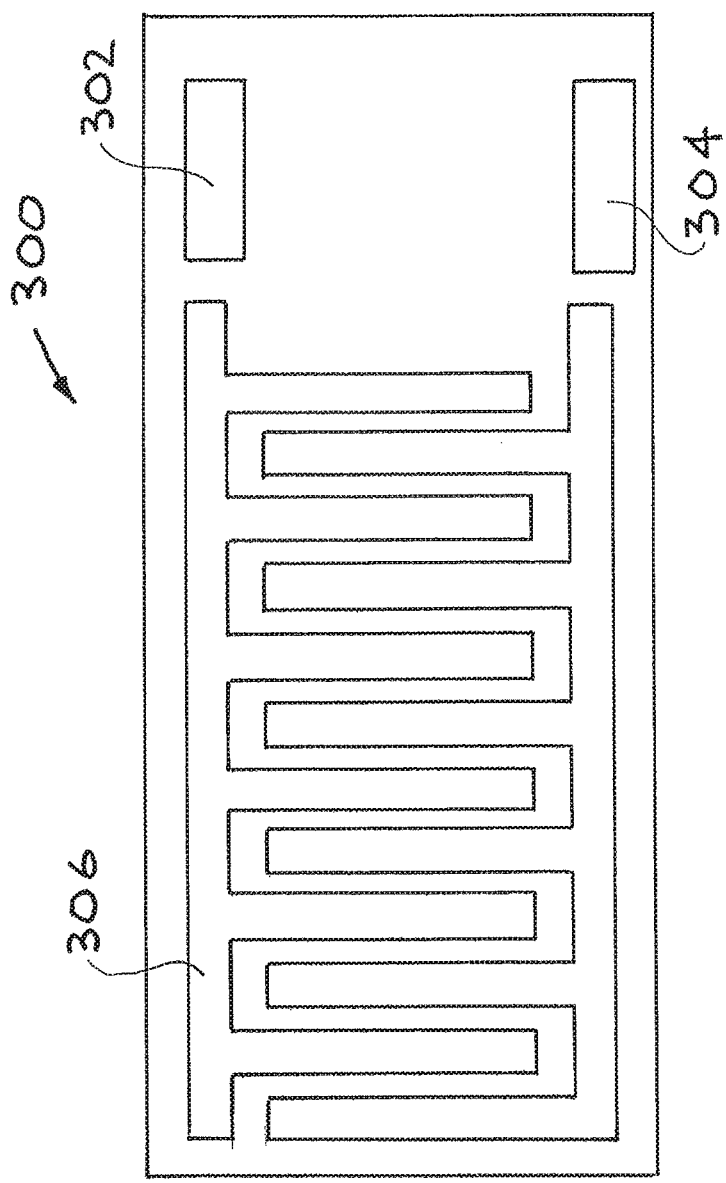
FIG. 3 illustrates yet another embodiment a rechargeable battery of the present invention.

Referring now to FIG. 3, a suitable solid-state fast ion conducting film is deposited over the interdigitated 2D electrodes with chemical vapor deposition (CVD), a physical vapor deposition (PVD) process such as thermal evaporation, electron beam evaporation, magnetron sputtering, and/or atomic layer deposition (ALD). Practical processes such as multi-magnetron sputtering as a means of building high-performance thin-film thermoelectric devices, including super-lattices formed from low-melting and difficult to process semiconductors can be used. The same technology can be readily applied to the fabrication of thin-film solid-state energy storage devices.

A practical three-dimensional cell architecture has been obtained with a solid-state fast ion conducting electrolyte and completely reversible, dimensionally-stable liquid electrodes, with the demonstration of a I Ah cell. A nanostructural material such as carbon aerogel is coated with those materials necessary for formation of an appropriate metal-halogen electrode ($Fe/FeCl_2$, $Ni/NiCl_2$, AggAgCl, Ag/Agt, Rb/Rbl, $Rb/Rbl_3$, etc.), or another appropriate electrode, using techniques such as CVD, PVD, and ALD. The resultant structure is then be over-coated with an appropriate film and/or coating of solid-state fast ion conductor. If insurmountable dimensional stability problems are encountered with homogenous inorganic ion-conducting films, a coating with dispersed particles with a polymeric binder could be used. Finally, liquid-phase metallic alloys (low-melting eutectics) are infiltrated into the pore structure, thereby forming the second electrode in a unique three-dimensional battery system with unparalleled rate capability, and none of the problems of self shielding usually encountered with porous electrode systems. Performance testing of the three-dimensional system, with novel low-melting eutectic metal electrode infiltrated into pores of nanostructural battery, is performed. Ultimately, the cells are included in the integration of three-dimensional cell architectures into larger 10-Ah battery.

The graphitic intercalation anode ($LiC_6$) has a specific capacity of 372 Ah/kg, a capacity density of 937 Ah/L, and a self-diffusion coefficient of approximately $10^{i9}$ cm/sec. The transition metal intercalation cathode ($LiCoO_2$) has a specific capacity of 274 Ah/kg, a capacity density of 1017 Ah/L, and a self-diffusion coefficient of approximately $10^{-9}$ $cm^2$/sec. These cells have now been developed to the point where specific energies of 180 to 200 W/kg and energy densities of 380-400 Wh/L can be achieved. The OCV of these cells is approximately 3.1 volts, with a nominal operating voltage of 3.8 volts, and an end voltage of approximately 3.0 volts. Work during the past decade has now increased the charge-discharge cycle life of these cells to the point where 1500 deep discharge cycles can be achieved (defined as the point where the cell capacity is 80% of the initial capacity immediately following formation). Microporous polyolefin separators with thicknesses of about 20 microns are easily penetrated by foreign objects and debris, or by lithium dendrites that can form during unplanned plating within the cells during cycling. The Li-ion systems continue to be plagues by serious safety issues with volatile and flammable organic solvents, with the formation of hazardous vapors from such fires that include not only CO and $CO_2$, but also HF. Battery fires with these systems have proven to be injurious, damaging, and very costly.

In general, systems relying on conventional liquid-filled, or polymer-gel lithium ion batteries could benefit greatly from a completely solid-state rechargeable battery. Such a battery would be available to achieve enhanced specific energy and energy density, through the elimination of an abundance of inert (non energy storing materials) present in the lithium-ion system, and would be able to operate far more safely due to the elimination of volatile and flammable organic solvents used in the electrolytes. While fast-ion conductors exist, and have been used for very small on-chip rechargeable batteries for memory backup in computers and other electronic devices, no solid-state battery exists that can be scaled up for applications in portable computing, wireless communications, electric vehicles, and the battlefield needs of the soldier and sailor. The proposed work will seek to develop a completely solid-state alternative to the modern lithium-ion battery. This battery, if developed, will be to the lithium-ion battery what transistors and integrated circuits were to the vacuum tube.

Microporous polyolefin separators with thicknesses of about 20 microns are easily penetrated by foreign objects and debris, or by lithium dendrites that can form during unplanned plating within the cells during cycling. The Li-ion systems continue to be plagues by serious safety issues with volatile and flammable organic solvents, with the formation of hazardous vapors from such fires that include not only CO and $CO_2$, but also HF. Battery fires with these systems have proven to be injurious, damaging, and very costly.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A rechargeable battery apparatus, comprising:
an enclosure,
a first electrode operatively connected to said enclosure wherein said first electrode is an electro-catalytic anode,
a second electrode operatively connected to said enclosure wherein said second electrode is an oxygen cathode,
a suspended flowing material in said enclosure wherein said suspended flowing material comprises intercalated transition metal oxide nanoparticles and wherein said suspended flowing material is directly connected to said first electrode wherein said first electrode is an electro-catalytic anode,
an electrolyte and separator between said first electrode and said second electrode,
an oxygen selective membrane between said first electrode and said second electrode,
a suspended flowing material storage tank containing said suspended flowing material wherein said suspended flowing material storage tank is connected to said enclosure by flow lines for flowing said suspended flowing material into and out of said enclosure,
a pump for circulating said suspended flowing material from said suspended flowing material storage tank into and out of said enclosure, and
a heat transfer unit connected to said suspended flowing material in said suspended flowing material storage tank.

2. A rechargeable battery apparatus, comprising:
an enclosure,
a first electrode operatively connected to said enclosure wherein said first electrode is an electro-catalytic anode,
a second electrode operatively connected to said enclosure wherein said second electrode is an oxygen cathode,
a flowing material in said enclosure wherein said flowing material comprises intercalated transition metal oxide nanoparticles and wherein said flowing material is directly connected to said first electrode wherein said first electrode is an electro-catalytic anode,
an electrolyte and separator between said first electrode and said second electrode,
an oxygen selective membrane between said first electrode and said second electrode, and
a circulation system for circulating said flowing material into and out of said enclosure, said circulation system including
a storage tank containing said flowing material wherein storage tank is connected to said enclosure by flow lines for flowing said flowing material into and out of said enclosure,
a pump for pumping said flowing material from said storage tank into and out of said enclosure,
a heat transfer unit connected to said flowing material in said storage tank.

\* \* \* \* \*